United States Patent
Pozzi et al.

(10) Patent No.: US 8,544,796 B2
(45) Date of Patent: Oct. 1, 2013

(54) PASSENGER SEAT ASSEMBLY WITH ASSOCIATED FLOOR PANEL AND AIRCRAFT SIDEWALL ATTACHMENT, AND METHOD

(75) Inventors: Alexander Nicholas Pozzi, Winston-Salem, NC (US); John W. Maynor, Jr., Double Oak, TX (US); Timothy Pahls, Lake Stevens, WA (US)

(73) Assignee: BE Aerospace, Inc., Wellington, FL (US)

( * ) Notice: Subject to any disclaimer, the term of this patent is extended or adjusted under 35 U.S.C. 154(b) by 379 days.

(21) Appl. No.: 13/053,866

(22) Filed: Mar. 22, 2011

(65) Prior Publication Data

US 2011/0233337 A1 Sep. 29, 2011

Related U.S. Application Data

(60) Provisional application No. 61/316,536, filed on Mar. 23, 2010.

(51) Int. Cl.
*B64D 11/00* (2006.01)

(52) U.S. Cl.
USPC .................................... 244/118.6; 244/122 R

(58) Field of Classification Search
USPC ............ 244/118.6, 122 R; 297/217.7, 463.2; 296/64
See application file for complete search history.

(56) References Cited

U.S. PATENT DOCUMENTS

| | | | | |
|---|---|---|---|---|
| 1,952,786 A * | 3/1934 | Bellanca | ..................... | 244/118.6 |
| 5,769,360 A * | 6/1998 | Kerbis et al. | ............... | 244/118.6 |
| 5,813,629 A * | 9/1998 | Cabrera | ..................... | 244/118.6 |
| 6,152,401 A * | 11/2000 | Green | .......................... | 244/118.6 |
| 6,260,813 B1 * | 7/2001 | Whitcomb | ................... | 248/503.1 |
| 6,375,119 B2 * | 4/2002 | Park et al. | .................. | 244/118.5 |
| 7,029,215 B2 | 4/2006 | Dowty | | |
| 7,182,292 B2 * | 2/2007 | Howard et al. | ........... | 244/122 R |
| 7,261,378 B2 | 8/2007 | Dowty et al. | | |
| 7,775,479 B2 * | 8/2010 | Benthien | .................. | 244/122 R |
| 7,798,447 B2 * | 9/2010 | Frantz et al. | ............... | 244/118.6 |
| 7,857,259 B2 * | 12/2010 | Baatz et al. | ............... | 244/122 R |
| 2011/0068226 A1 * | 3/2011 | Baatz et al. | ............... | 244/118.6 |

FOREIGN PATENT DOCUMENTS

EP 530900 A1 * 3/1993

* cited by examiner

*Primary Examiner* — Christopher P Ellis
(74) *Attorney, Agent, or Firm* — Shumaker, Loop & Kendrick, LLP

(57) ABSTRACT

An aircraft passenger seat assembly includes a seat frame on which is mounted at least one seat back, a seat pan and a plurality of seat legs and at least one seat floor panel having integrated floor panel seat tracks mounted therein and adapted for being mounted onto an aircraft deck. A mounting rail is mounted onto an aircraft fuselage sidewall, and leg track fasteners detachably secure the seat legs to the floor panel seat tracks and frame seat fasteners for mounting the seat frame to the sidewall mounted rail.

20 Claims, 12 Drawing Sheets

PASSENGER SEAT ASSEMBLY WITH ASSOCIATED FLOOR PANEL AND AIRCRAFT SIDEWALL ATTACHMENT, AND METHOD

TECHNICAL FIELD AND BACKGROUND OF THE INVENTION

The present invention relates generally to the field of aircraft passenger seat assemblies, and more particularly, to a passenger seat assembly having a frame that attaches to the sidewall of the aircraft, as well as associated composite floor panels that replace the existing floor panels, attach to the aircraft floor structure, and integrate new/additional seat tracks at locations different from the original aircraft seat tracks. The invention also includes a method of securing passenger seats to the deck of an aircraft passenger cabin.

Conventional passenger seat assemblies typically include seat frames that are releasably secured to the deck of an aircraft by means of anchor fittings that lock into tracks that extend longitudinally along the length of the passenger cabin. U.S. Pat. Nos. 7,029,215 and 7,261,378 are illustrative of such devices.

The U.S. Pat. No. 7,029,215 discloses and claims a track fastener assembly for securing a seat or cargo apparatus to a floor track of a vehicle. The assembly includes a bottom rail with forward and aft ends. Front and rear movable slides carrying locking studs are carried by the bottom rail. A locking rod having a helical groove formed in its outer surface is operatively connected to the bottom rail and the slides. Rotation of the locking rod causes the slides to move axially from an installation position to a locking position. As the slides move to the locking position, they are deflected upwards along with the attached locking studs, clamping the track fastener assembly to the track.

The U.S. Pat. No. 7,261,378 discloses and claims a locking apparatus for a moveable component of an aircraft seat. The locking apparatus includes a housing for being slidably received in a track, a first pair of opposed cams pivotally mounted in the housing, and a release member. The cams are moved between a lock position where the cams prevent the housing from sliding within the track and a release position. The release member is selectively moveable between a first position where the cams are maintained in the lock position and a second position where the cams are maintained in the release position.

Structures such as described in the above-referenced patents and many others utilize the deck of the aircraft exclusively. However, evolutionary developments in aircraft seat design, spacing and accessories often utilize areas under the seat bottom for mounting electronic and seat support components. In addition, increased rigidity to the entire seating structure can be enhanced by providing attachment points in areas other than the aircraft deck. These structural design limitations restrict the geometry of the seat frame and fail to make use of available surrounding attachment points, resulting in added weight, complexity, cost and decreased rigidity. Accordingly, it would be desirable to provide a seat frame having a lightweight design and overall geometry that advantageously exploits the available cabin space and surrounding attachment points, as well as an associated floor panel structure including seat tracks located to accommodate the seat frame, resulting in an overall lightweight, simple, rigid and cost saving design.

SUMMARY OF THE INVENTION

Therefore, it is one object of the invention to provide an aircraft seat that includes at least one attachment point between the seat and the aircraft sidewall.

According to one aspect of the invention an aircraft passenger seat assembly comprises a seat frame on which is mounted at least one seat back, a seat pan and a plurality of seat legs. At at least one seat floor panel having integrated floor panel seat tracks mounted therein is mounted onto an aircraft deck. A mounting rail is adapted to be mounted onto an aircraft fuselage sidewall, and leg track fasteners detachably secure the seat legs to the floor panel seat tracks and frame seat fasteners and mount the seat frame to the sidewall mounted rail.

According to another aspect of the invention, the frame defines a plurality of laterally-positioned seats.

According to another aspect of the invention the aircraft deck includes seat-mounting tracks extending longitudinally along a length of the aircraft deck in a laterally-offset position from the integrated seat tracks mounted in the floor panel.

According to another aspect of the invention mounting rail is adapted to extend longitudinally along a length of the fuselage at a height approximating the height of the seat pan.

According to another aspect of the invention, the mounting rail is adapted to extend longitudinally along a length of the fuselage at a height approximating the height of the seat pan, and includes regularly spaced-apart mounting holes for receiving fasteners carried by an adjacent frame element of the seat assembly.

According to another aspect of the invention, an aircraft passenger seat assembly includes a plurality of seat pans, and each seat pan is supported from beneath at least one of its left and right sides by a front leg extending from proximate the front edge of the seat pan to a position on the floor panel seat track forward of the front edge of the seat pan and a rear leg extending from proximate the rear edge of the seat pan to a position rearward of the rear edge of the seat pan to a position on the floor panel seat track rearward of the rear edge of the seat pan. An intermediate leg extends between a position proximate an intersection of the front leg and seat pan to a position proximate an intersection of the rear leg and the floor panel seat track for providing a cross-brace supporting structure that positions the weight of the seat and a passenger seated therein between the front leg and rear leg and seat track attachment positions.

According to another aspect of the invention, the seats are adapted to be positioned at an angle other than parallel to the longitudinal axis of the aircraft, and the integrated seat tracks to which the seats are mounted extend in a like angle other than parallel to the longitudinal axis of the aircraft.

According to another aspect of the invention a seat pan closest to the aircraft sidewall is supported from beneath by only a single set of legs positioned at a side of the seat pan furthest from the sidewall and supported at a side closest to the sidewall by attachment of the frame to the sidewall mounted rail.

According to another aspect of the invention, the sidewall mounted rail includes an elongate member defining first and second flanges extending laterally inwardly toward the seat assembly, each of the first and second flanges having vertically-aligned corresponding openings spaced-apart along the length of the rail for receiving locking devices therethrough.

According to another aspect of the invention, the frame is supported within the aircraft at two vertically spaced-apart positions.

According to another aspect of the invention, an aircraft passenger seat assembly includes a seat frame on which is mounted at least one seat back, a seat pan and a plurality of seat legs defining a plurality of laterally-positioned seats and at least one seat floor panel having integrated floor panel seat tracks mounted therein and adapted for being mounted onto an aircraft deck, wherein the aircraft deck includes seat-mounting tracks extending longitudinally along a length of the aircraft deck in a laterally-offset position from the integrated seat tracks mounted in the floor panel. A mounting rail is mounted onto an aircraft fuselage sidewall extending longitudinally along a length of the fuselage at a height approximating the height of the seat pan; and leg track fasteners detachably secure the seat legs to the floor panel seat tracks and frame seat fasteners and mount the seat frame to the sidewall mounted rail.

According to another aspect of the invention, the mounting rail includes regularly spaced-apart mounting holes for receiving fasteners carried by an adjacent frame element of the seat assembly.

According to another aspect of the invention, each seat pan is supported from beneath at least one of its left and right sides by a front leg extending from proximate the front edge of the seat pan to a position on the floor panel seat track forward of the front edge of the seat pan, and a rear leg extends from proximate the rear edge of the seat pan to a position rearward of the rear edge of the seat pan to a position on the floor panel seat track rearward of the rear edge of the seat pan. An intermediate leg extends between a position proximate an intersection of the front leg and seat pan to a position proximate an intersection of the rear leg and the floor panel seat track and provides a cross-brace supporting structure that positions the weight of the seat and a passenger seated therein between the front leg and rear leg and seat track attachment positions.

According to another aspect of the invention, a method is provided for mounting an aircraft passenger seat assembly within an aircraft, that may include the steps of fabricating a seat frame on which is mounted at least one seat back, a seat pan and a plurality of seat legs, and fabricating seat floor panels having integrated floor panel seat tracks mounted therein and mounting the seat floor panels onto an aircraft deck. A mounting rail us attached onto an aircraft fuselage sidewall; and the seat legs are detachably secured to the floor panel seat tracks and the frame to the sidewall mounted rail at a height approximating the height of the seat pan.

According to another aspect of the invention, the method includes the step of mounting the seat assembly longitudinally along a length of the aircraft deck in a laterally-offset position from the integrated seat tracks mounted in the floor panel.

According to another aspect of the invention, the mounting rail is positioned to extend longitudinally along a length of the fuselage.

According to another aspect of the invention, the method includes the step of attaching the seat assembly to the mounting rail with fasteners carried by an adjacent frame element of the seat assembly positioned in regularly spaced-apart mounting holes in the mounting rail.

According to another aspect of the invention, the method includes the step of attaching the seat assembly to the mounting rail with fasteners carried by an adjacent frame element of the seat assembly positioned in regularly spaced-apart mounting holes in the mounting rail.

According to another aspect of the invention, the method includes the step of supporting the seat assembly frame within the aircraft at two vertically spaced-apart positions.

According to another aspect of the invention, the method includes the steps of supporting the seat pan from beneath at least one of its left and right sides by positioning a front leg extending from proximate the front edge of the seat pan to a position on the floor panel seat track forward of the front edge of the seat pan. A rear leg is positioned from proximate the rear edge of the seat pan to a position rearward of the rear edge of the seat pan. An intermediate leg is positioned between a position proximate an intersection of the front leg and seat pan to a position proximate an intersection of the rear leg and the floor panel seat track for providing a cross-brace supporting structure that positions the weight of the seat and a passenger seated therein between the front leg and rear leg and seat track attachment positions.

BRIEF DESCRIPTION OF THE DRAWINGS

These and other features, aspects and advantages of the present invention are understood when the following detailed description of the invention is read with reference to the accompanying drawings, in which.

DETAILED DESCRIPTION AND PREFERRED EMBODIMENT OF THE INVENTION

Figure 1:
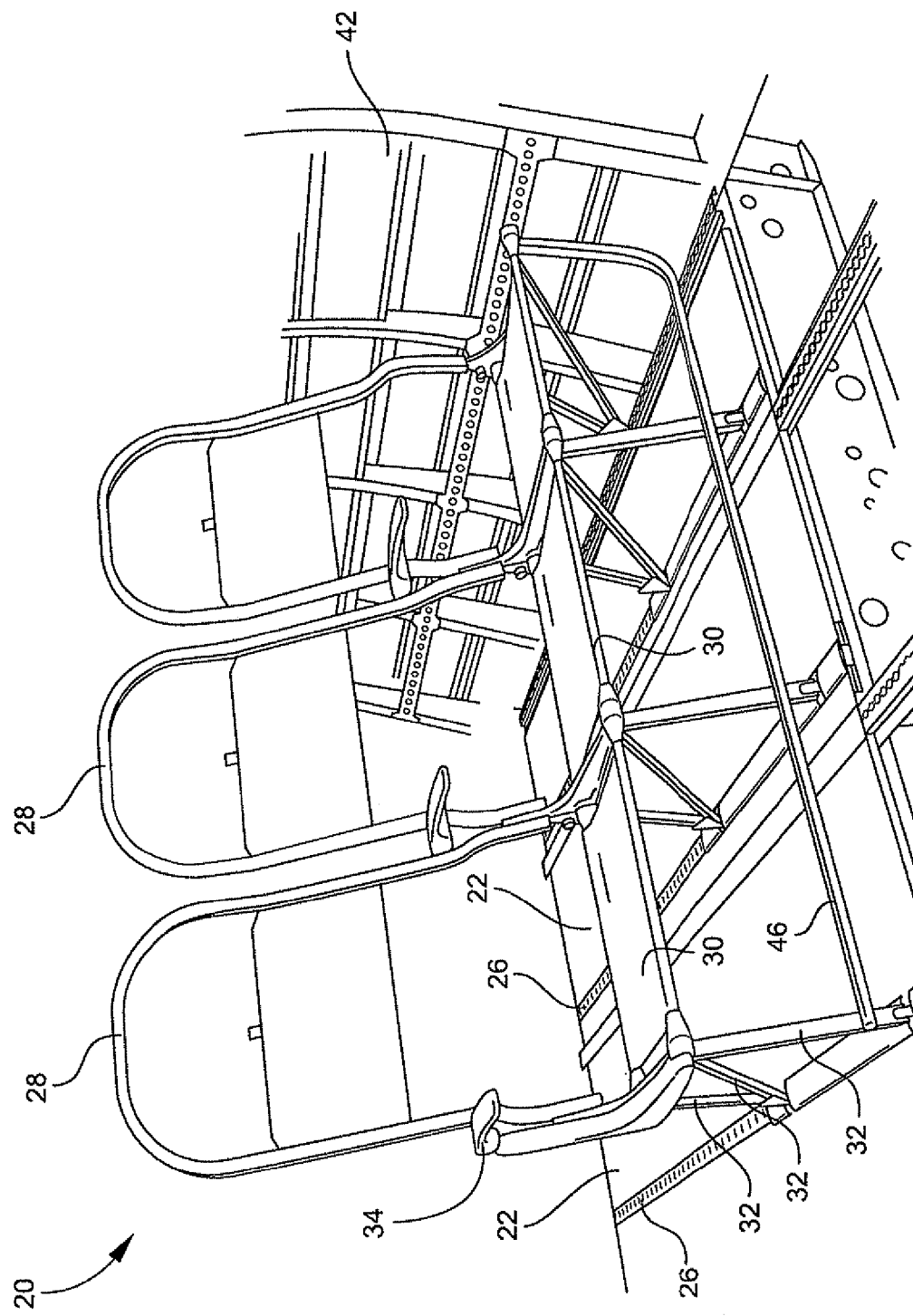
FIG. 1 is a front perspective view of a passenger seat assembly having sidewall attachment and associated floor panels including seat tracks in accordance with an embodiment of the invention.
Figure 2:
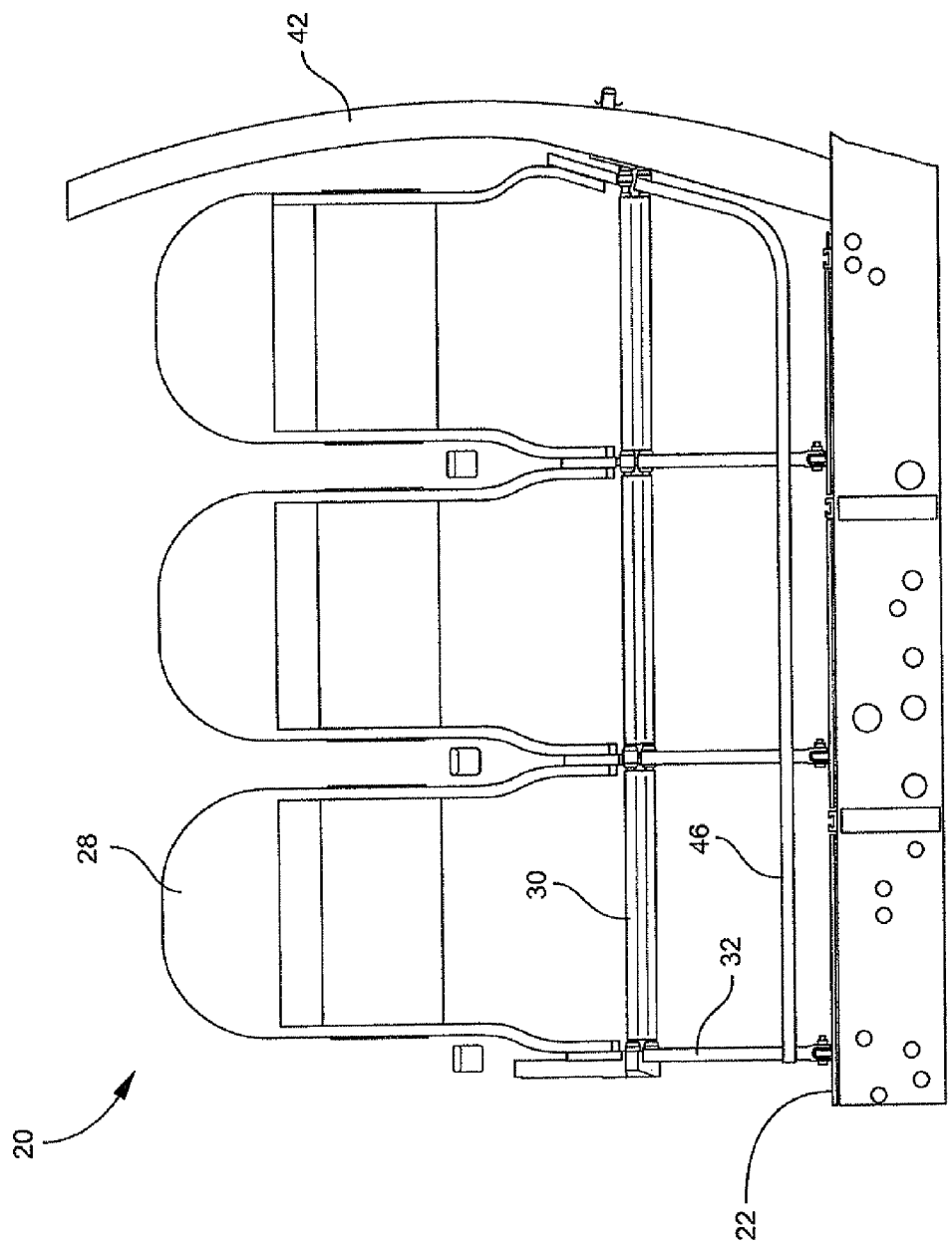
FIG. 2 is a front elevation view of the seat assembly of FIG. 1 further illustrating the aircraft floor structure.

Referring to FIGS. 1-4, an aircraft seat assembly and associated floor panels including integrated seat tracks are shown. The seat assembly, shown generally at reference numeral 20, includes three seating units supported by three sets of legs, and supported at one end to the sidewall of the aircraft. It is envisioned, however, that the seat assembly may include a greater or lesser number of seats and corresponding number of sets of legs. The seat assembly 20 is detachably secured to a plurality of underlying composite floor panels 22 that are secured to the aircraft floor structure 24, replace the original floor panels, and integrate new/additional seat tracks 26 at locations different from the original aircraft seat tracks.

The seat assembly 20 includes frame portions defining seat backs 28, seat pans 30, supporting legs 32, and armrests 34 collectively forming a three-seat unit. Although not shown, the seat assembly 20 may include additional structural components such as, but not limited to, seat pan length adjusters, leg rests and moveable head rests. Each seat back 28 and seat pan 30 is preferably spanned with a shell, webbing or other support structure that may be padded and upholstered to provide passenger comfort.

Figure 3:
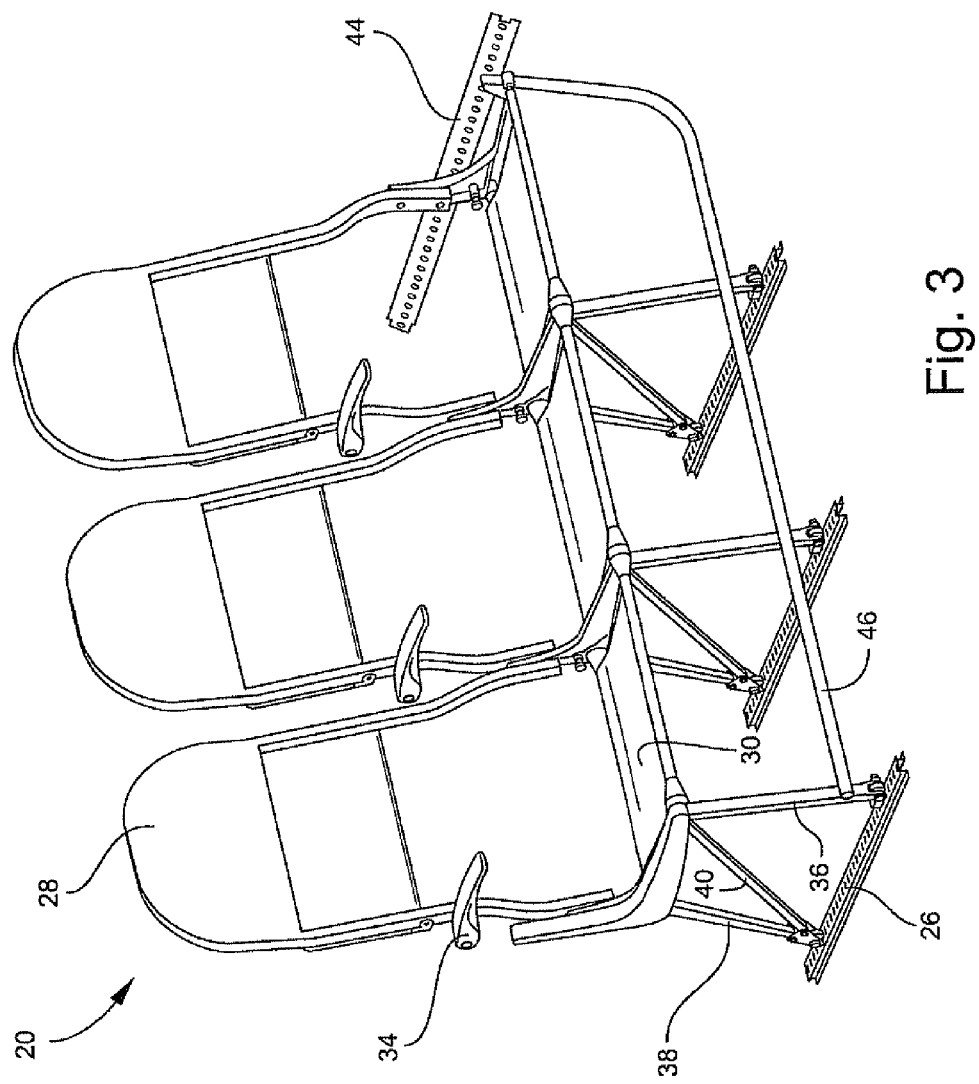
FIG. 3 is an isolated front view of the seat assembly, seat tracks and wall mount.
Figure 4:
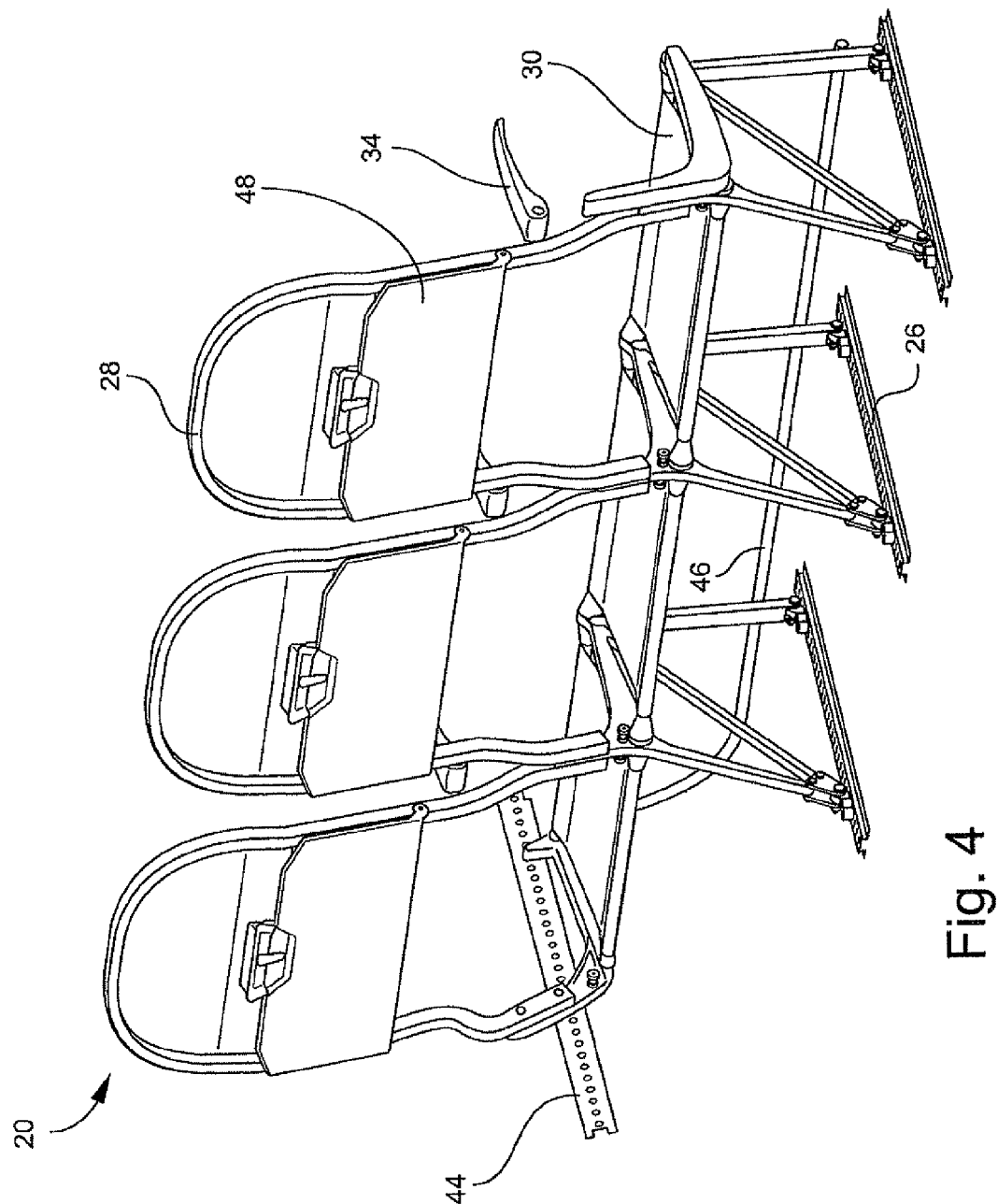
FIG. 4 is an isolated rear view of the seat assembly of FIG. 3.

As best shown in FIG. 3, each seat pan 30 is supported from beneath at least one of its left and right sides by a set of legs including a front leg 36 extending from about the front edge of the seat pan 30 to a position on the seat track 26 forward of the front edge of the seat pan 30, a rear leg 38 extending from about the rear edge of the seat pan 30 to a position rearward of the rear edge of the seat pan 30, and an intermediate leg 40 extending between about the intersection of the front leg 36 and seat pan 30 to about the intersection of the rear leg 38 and the seat track 26, thus at about a 45 degree angle relative to horizontal. This leg arrangement thus forms a supporting structure that positions the weight of the seat and passenger between the front and rear leg/seat track attachment points, and not directly over the attachment points. The angle and attachment points of leg 40 function as a cross brace that provides stability to the support structure and prevents the seat pan 30 from moving about its lateral (i.e. left-to-right) axis.

Figure 5:
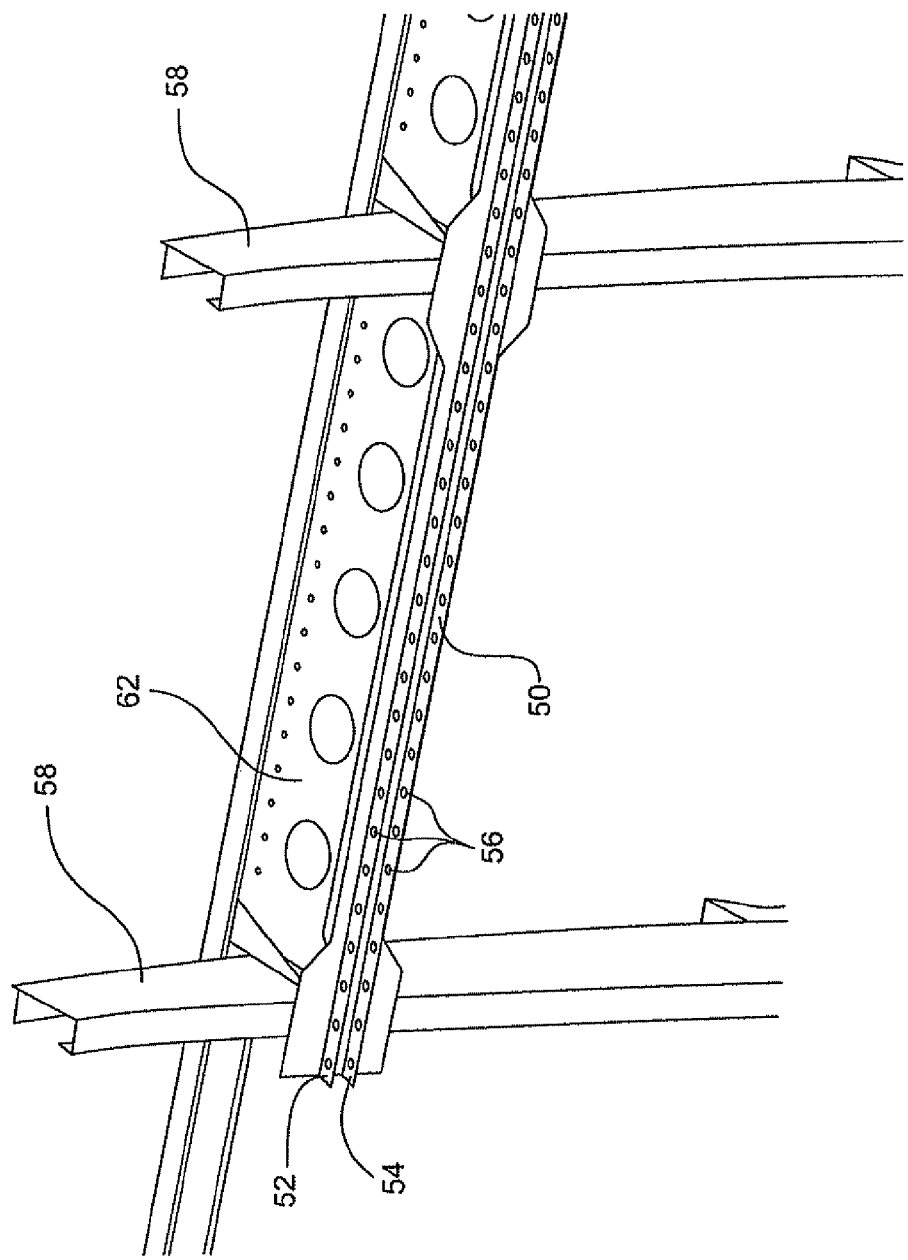
FIG. 5 illustrates the wall mount attachment to the aircraft sidewall structure.
Figure 6:
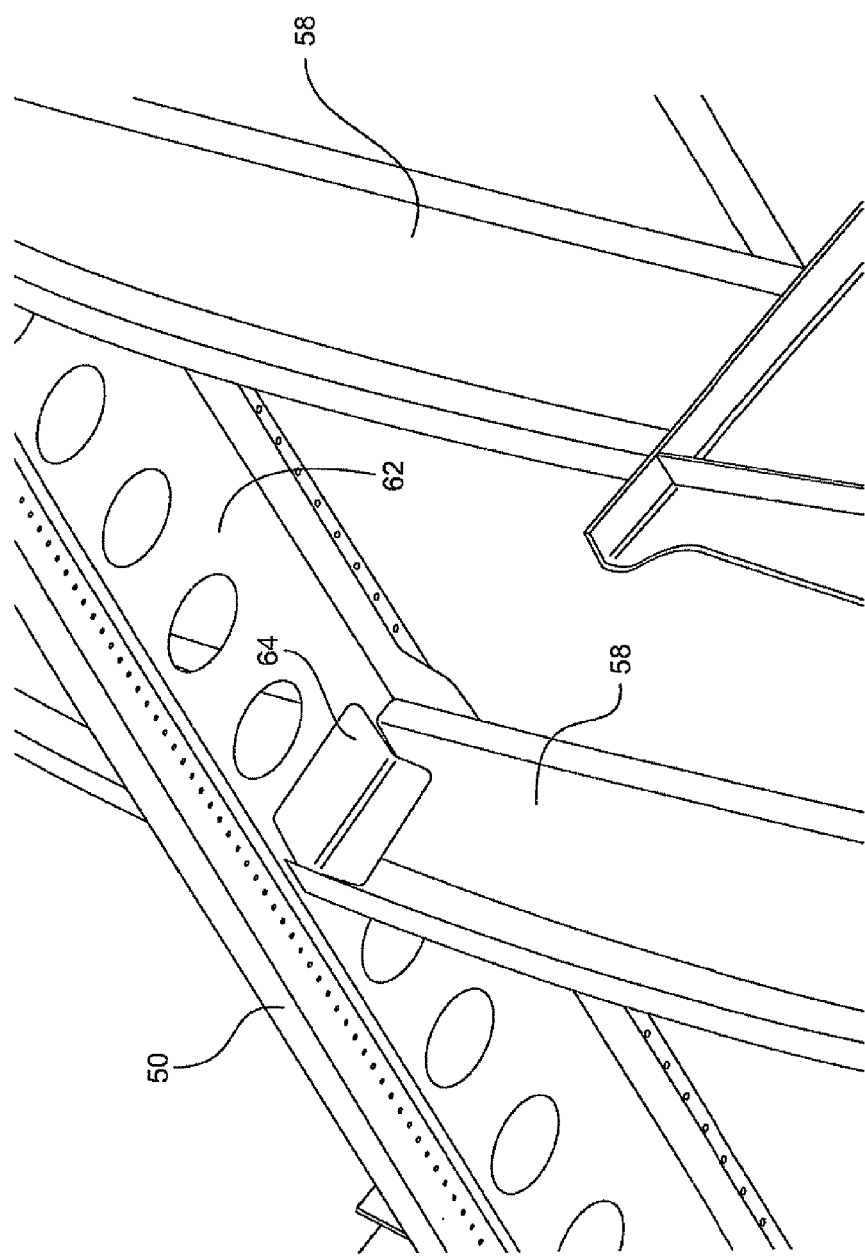
FIG. 6 is a detailed view of the wall mount attachment.
Figure 7:
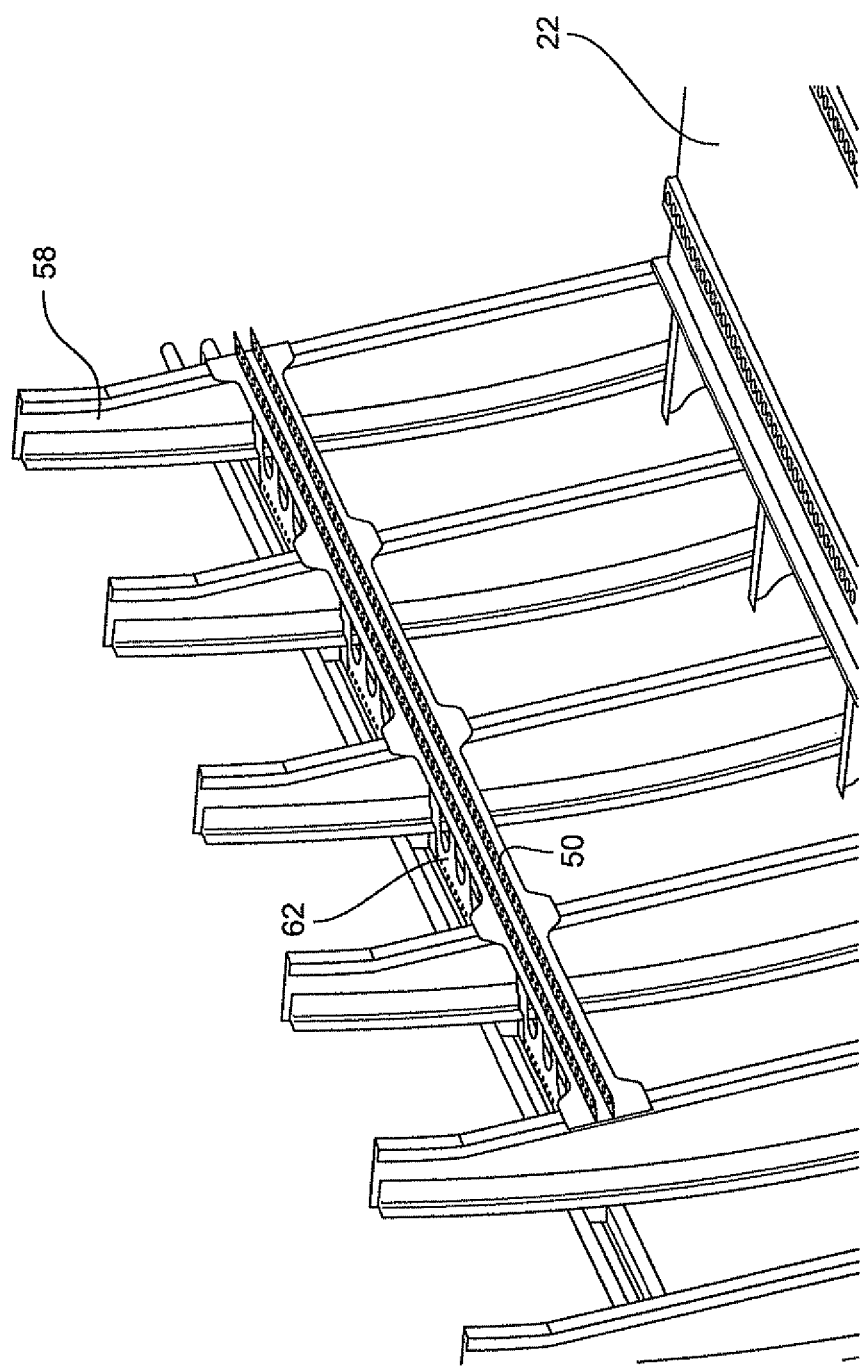
FIG. 7 is another view of the wall mount attachment.
Figure 8:
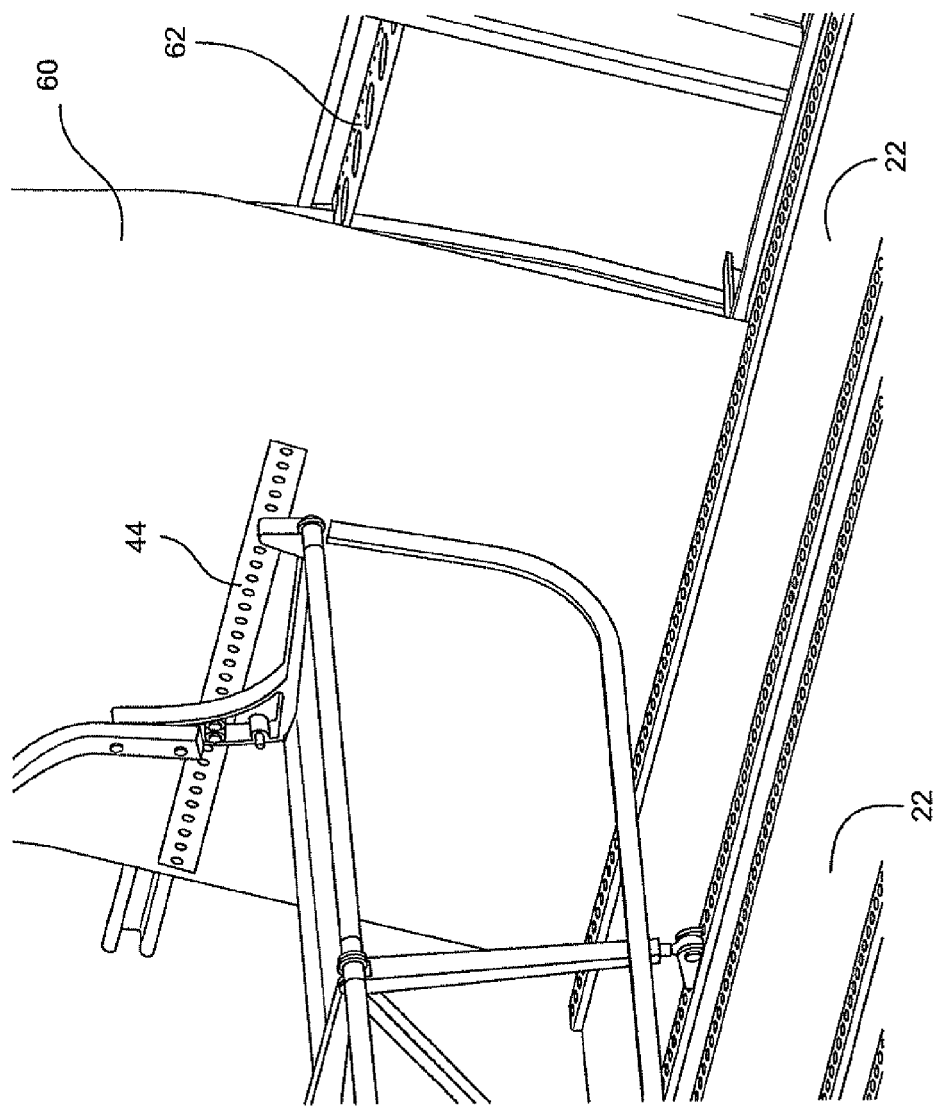
FIG. 8 is a detailed view illustrating wall mount attachment through a wall panel.

Referring to FIG. 8, the seat closest to the aircraft sidewall 42 is supported from beneath by only one set of legs positioned at the side of the seat furthest from the sidewall 42, and supported at the other side of the seat through attachment to a track 44 secured to sidewall panel and underlying wall mount structure, as shown in FIGS. 5-7. The track 44 defines a plurality of linearly arranged and equally spaced-apart openings for receiving fasteners therethrough. The track 44 is arranged generally horizontal or at an angle defined by the attachment points on the seat frame, for example the two attachment points shown located in alignment with about the forward and rear edges of the seat pan. The track 44 may define openings similar to those of the seat tracks 26 to receive like fasteners. The track 44 is secured to an underlying wall mount structure through the sidewall panel 60, and the openings are positioned facing the seat assembly 20, thus generally perpendicular to the floor panels 22.

The plurality of front legs 36 of the seat assembly 20 are interconnected by a generally horizontal cross member 46 that is positioned slightly elevated and spaced-apart from the underlying floor panels 22, thus serving as a baggage retainer/foot rest for the aft positioned seats. Adjacent the sidewall 42, the cross member 46 bends upwardly at an angle that follows the curvature of the sidewall and terminates at an attachment point with the front edge of the seat pan 30 closest to the sidewall and proximate the attachment point of the seat assembly to the track 44. As shown, each seat back 28 defines an arched top end and supports a selectively deployable tray table assembly 48 for use by the aft-positioned passenger. As known to those skilled in the art, the seat backs 28 are preferably configured to move between upright and reclined positions for passenger comfort.

Referring to FIGS. 5-7, the underlying wall mount support structure for the track 44 is shown. The wall mount support structure includes an elongate member 50 defining first and second flanges 52, 54 extending laterally therefrom toward the seat assembly, each defining corresponding openings 56 linearly and equally spaced apart along the length of the track 44. The track 44 may widen at each intersection with an underlying support beam 58, and neck-down between adjacent beams. The track 44 is supported from behind by the support beams 58 and by slotted webbing 62 installed between adjacent support beams. Brackets may be used to connected the webbing 62 to the beams 58.

In one embodiment, the elongate member 50 may be free from direct attachment to the underlying beams to preserve the integrity of the sidewall structure. In another embodiment, the member 50 is fastened to both the beams 58 and webbing 62. In a further embodiment, the webbing 62 replaces the existing shear clip that attaches the frames to the beams. Referring specifically to FIG. 6, a machined clip 64 attaches the webbing 62 to the beams. In one embodiment, the track 44 and member 50 are the same component, having a structure of either component shown herein.

Figure 9:
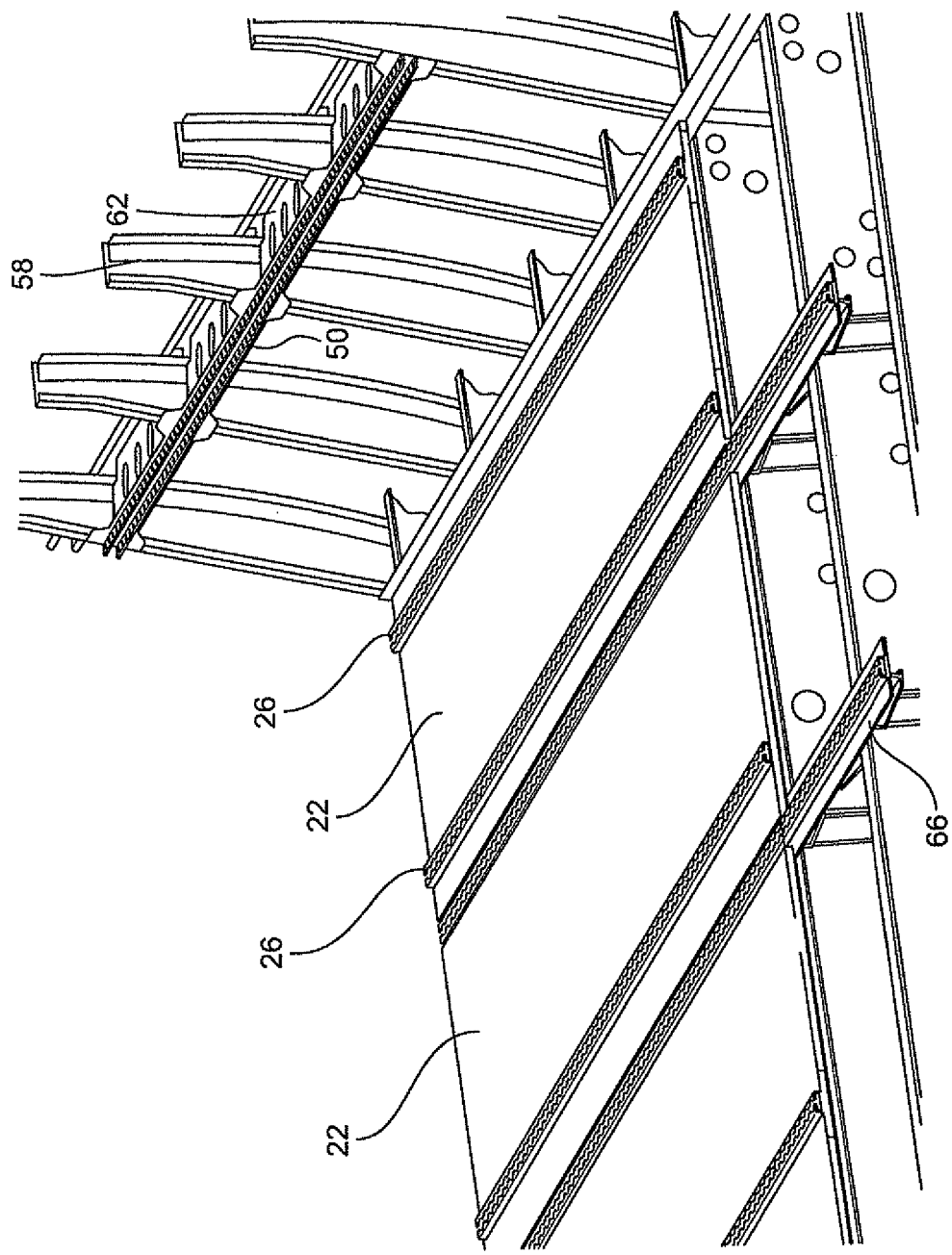
FIG. 9 is a perspective view of the floor panels illustrating their attachment to the aircraft floor structure.
Figure 10:
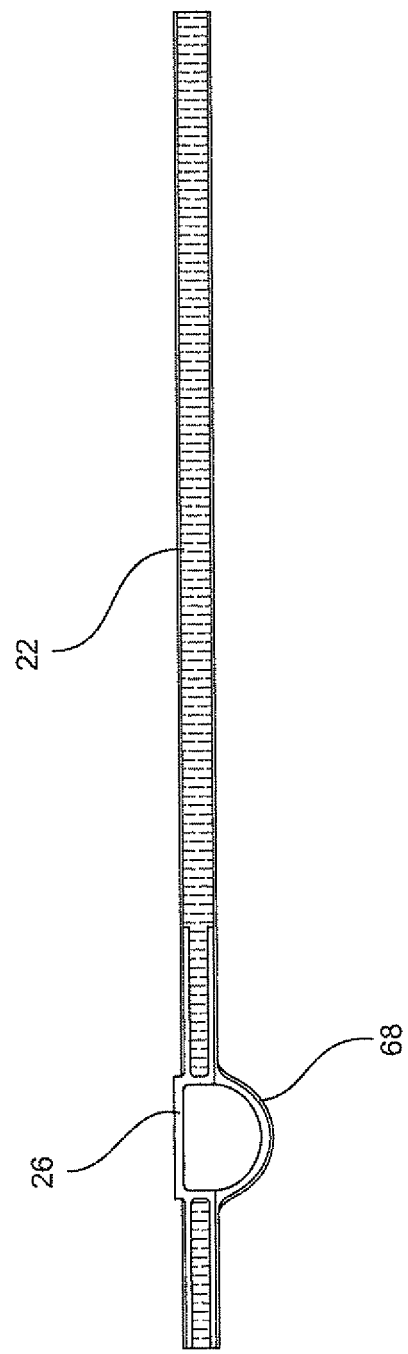
FIG. 10 is a sectional view of a floor panel and seat track.

Referring to FIGS. 9 and 10, each of the plurality of composite floor panels 22 is generally rectangular in shape and includes at least one seat track 26 running longitudinally along the length of the panel from end to end, and positioned generally parallel to the longitudinal axis of the aircraft. The number of seat tracks 26 per panel 22 is dependent upon the span (i.e. width) across the floor and the corresponding positions of the sets of legs of the seat assembly 20. Panels 22 may be sized and shape according to the framework of the underlying aircraft floor structure. It is envisioned that should the seats be positioned at an angle other than parallel to the longitudinal axis of the aircraft, the seat track positions would be adjusted to accommodate that angle as well. Each panel 22 defines a generally planar top surface defining the deck of the aircraft that may be carpeted, insulated, further covered, etc., and includes the seat track extending vertically upward therefrom. The panels 22 are secured to the aircraft structure, such as to the floor joints 46, using any conventional fastener or technique common in aircraft construction. Panels 22 arranged along the length of the aircraft are preferably aligned such that the seat tracks 26 are longitudinally aligned.

Referring specifically to FIG. 9, the original seat tracks are illustrated at 66, and are shown shifted left of the desired position of seat tracks 26 when viewing the floor structure from the cockpit back. Referring to FIG. 10, a sectional view of a panel 22 and seat track 26 taken through the width reveals that the seat track 26 extends both above and below the remainder of the panel 22, and in one embodiment, graphite plies 68 are used to wrap the seat track extrusion. The panels 22 may be made from composite materials for strength and weight saving benefits.

Figure 12:
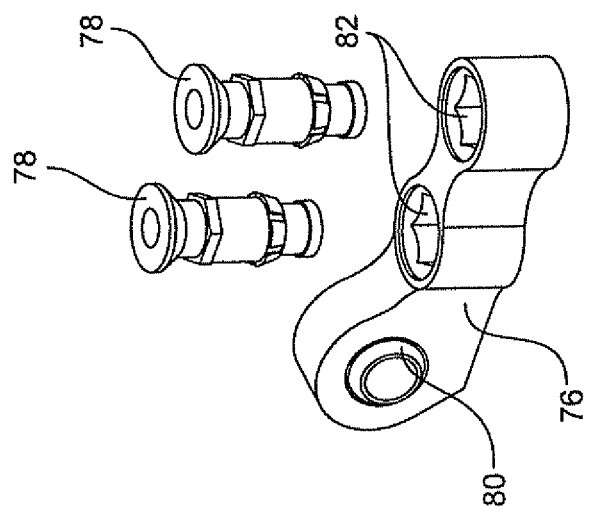
FIG. 12 is an isolated view of the track fastener of FIG. 11.
Figure 11:
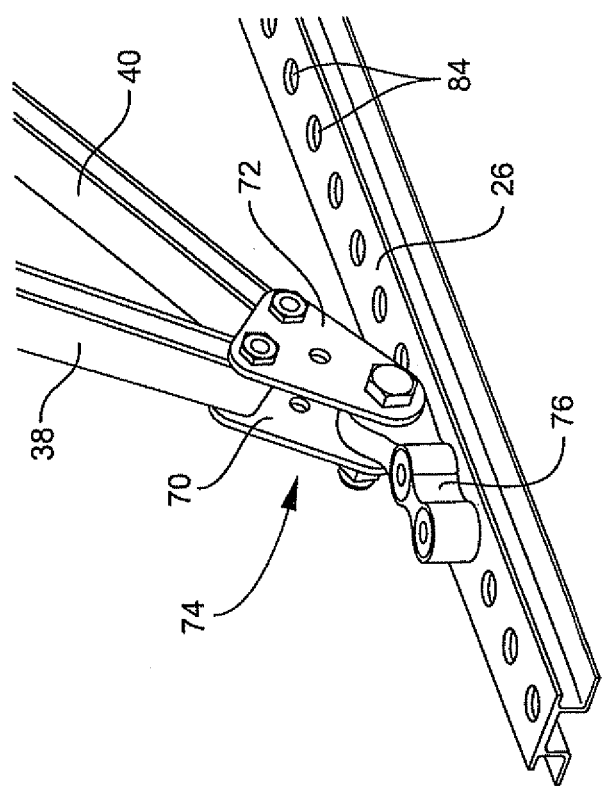
FIG. 11 is a detailed view of the rear track fitting.

Referring to FIGS. 11 and 12, the rear track fitting functions to detachably secure the rear and intermediate legs 38, 40 to the seat track 26. The rear and intermediate legs 38, 40 terminate at and are secured between first ends of opposing plates 70, 72 of a bracket assembly 74. A rear track fastener 76 is secured at its first end between the second ends of the plates 70, 72 and defines at least one opening therethrough for receiving a fastener 78, such as an E-nut, for securing the rear track fastener 76 to the seat track 26. Pivoting movement of the rear track fastener 76 relative to the bracket assembly 74 may be facilitated by the use of a bearing 80, which allows proper seating of the rear track fastener 76 on the seat track 26. The rear track fastener 76 preferably includes more than one fastener attachment point to provide secure attachment and prevent twisting of the seat assembly 20 relative to the seat track 26. The fasteners 78 are received through adjacent openings 82 defined through the rear track fastener 76 and engage within appropriate underlying adjacent openings 84 defined through the seat track 26. The fasteners 78 may be configured to require a special tool for insertion/removal to prevent tampering. As shown, the seat tracks 26 include a plurality of linearly arranged openings 84 spaced apart at equal intervals such that the seat track fastener 76 may be attached at any desired point along the length of the seat track.

Figure 13:
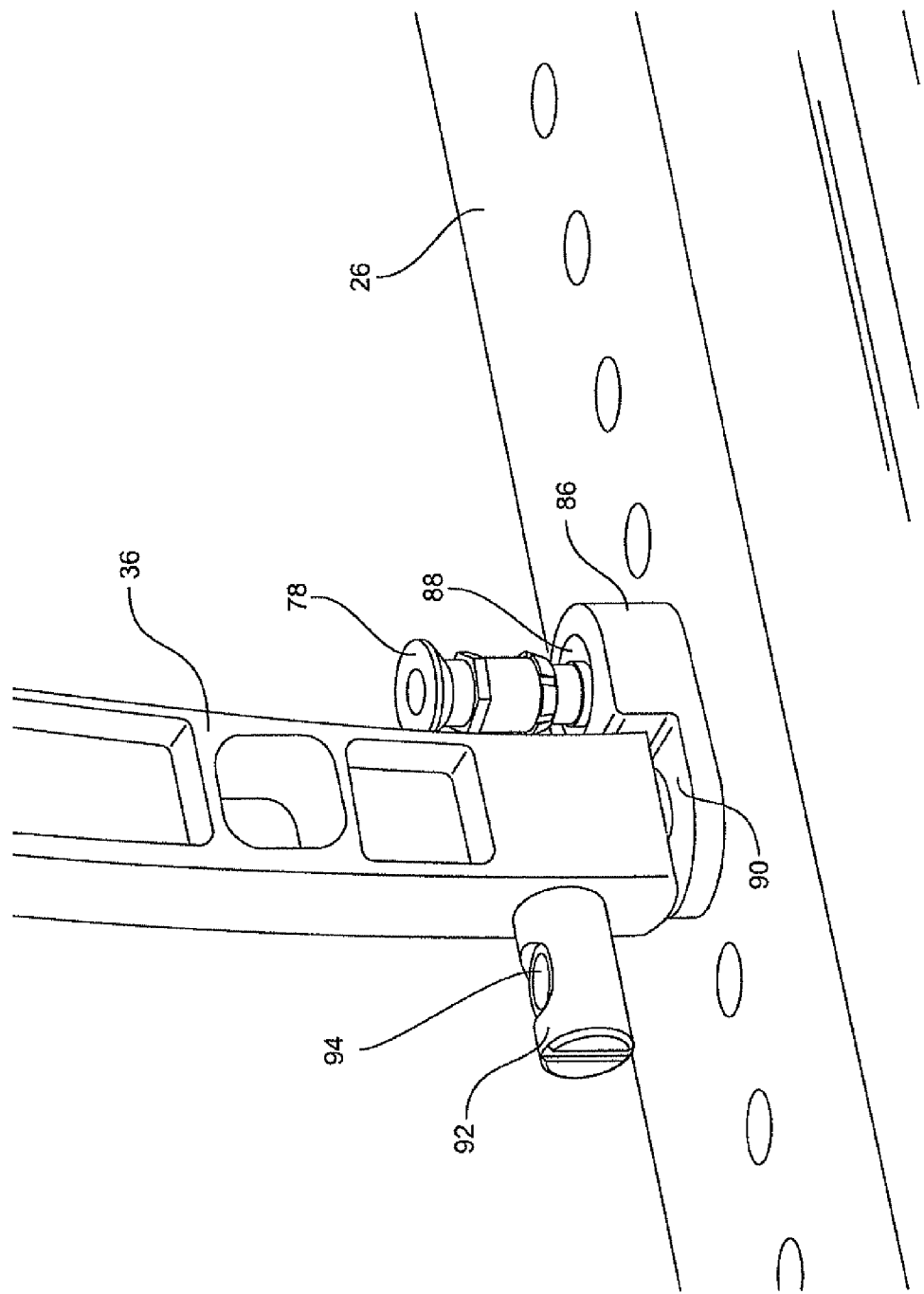
FIG. 13 is a detailed view of the front track fitting.

Referring to FIG. 13, the front track fitting functions to detachably secure the front leg 36 to the seat track 26. The front leg 36 attaches to a front track fastener 86 that defines a first opening 88 offset from the leg for receiving a fastener 78 therethrough, such as an E-nut, that is received within aligned openings defined through the fastener 86 and seat track 26. The front track fastener 86 further defines a flat 90 upon which the front leg 36 seats and is secured to. As shown, the front track fastener 86 is secured to the front leg 36 by way of a barrel nut 92 defining a threaded opening 94 therethrough that is treaded to engage a bolt or other fastener. The bolt may be received from beneath the front track fastener 86, through the fastener, through an opening defined in the leg 36, and into engagement with the barrel nut 92. The bolt may further engage an opening in the seat track 26.

While a seat assembly and associated replacement floor panels having seat tracks have been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. An aircraft passenger seat assembly, comprising:
   (a) a seat frame on which is mounted at least one seat back, a seat pan and a plurality of seat legs;
   (b) at least one seat floor panel having integrated floor panel seat tracks mounted therein and adapted for being mounted onto an aircraft deck;
   (c) a mounting rail adapted to be mounted onto an aircraft fuselage sidewall; and
   (d) leg track fasteners for detachably securing the seat legs to the floor panel seat tracks and frame seat fasteners for mounting the seat frame to the sidewall mounted rail.

2. An aircraft passenger seat assembly according to claim 1, wherein the frame defines a plurality of laterally-positioned seats.

3. An aircraft passenger seat assembly according to claim 1, wherein the aircraft deck includes seat-mounting tracks extending longitudinally along a length of the aircraft deck in a laterally-offset position from the integrated seat tracks mounted in the floor panel.

4. An aircraft passenger seat assembly according to claim 1, wherein the mounting rail is adapted to extend longitudinally along a length of the fuselage at a height approximating the height of the seat pan.

5. An aircraft passenger seat assembly according to claim 1, wherein the mounting rail is adapted to extend longitudinally along a length of the fuselage at a height approximating the height of the seat pan, and includes regularly spaced-apart mounting holes for receiving fasteners carried by an adjacent frame element of the seat assembly.

6. An aircraft passenger seat assembly according to claim 1, wherein each seat pan is supported from beneath at least one of its left and right sides by:
   (a) a front leg extending from proximate the front edge of the seat pan to a position on the floor panel seat track forward of the front edge of the seat pan; and
   (b) a rear leg extending from proximate the rear edge of the seat pan to a position rearward of the rear edge of the seat pan to a position on the floor panel seat track rearward of the rear edge of the seat pan, and an intermediate leg extending between a position proximate an intersection of the front leg and seat pan to a position proximate an intersection of the rear leg and the floor panel seat track for providing a cross-brace supporting structure that positions the weight of the seat and a passenger seated therein between the front leg and rear leg and seat track attachment positions.

7. An aircraft passenger seat assembly according to claim 1, wherein the seats are adapted to be positioned at an angle other than parallel to the longitudinal axis of the aircraft, and the integrated seat tracks to which the seats are mounted extend in a like angle other than parallel to the longitudinal axis of the aircraft.

8. An aircraft passenger seat assembly according to claim 1, wherein a seat pan closest to the aircraft sidewall is supported from beneath by only a single set of legs positioned at a side of the seat pan furthest from the sidewall and supported at a side closest to the sidewall by attachment of the frame to the sidewall mounted rail.

9. An aircraft passenger seat assembly according to claim 1, wherein the sidewall mounted rail includes an elongate member defining first and second flanges extending laterally inwardly toward the seat assembly, each of the first and second flanges having vertically-aligned corresponding openings spaced-apart along the length of the rail for receiving locking devices therethrough.

10. An aircraft passenger seat assembly according to claim 1, wherein the frame is supported within the aircraft at two vertically spaced-apart positions.

11. An aircraft passenger seat assembly, comprising:
    (a) a seat frame on which is mounted at least one seat back, a seat pan and a plurality of seat legs defining a plurality of laterally-positioned seats;
    (b) at least one seat floor panel having integrated floor panel seat tracks mounted therein and adapted for being mounted onto an aircraft deck, wherein the aircraft deck includes seat-mounting tracks extending longitudinally along a length of the aircraft deck in a laterally-offset position from the integrated seat tracks mounted in the floor panel;
    (c) a mounting rail adapted to be mounted onto an aircraft fuselage sidewall extending longitudinally along a length of the fuselage at a height approximating the height of the seat pan; and
    (d) leg track fasteners for detachably securing the seat legs to the floor panel seat tracks and frame seat fasteners for mounting the seat frame to the sidewall mounted rail.

12. An aircraft passenger seat assembly according to claim 11, wherein the mounting rail includes regularly spaced-apart mounting holes for receiving fasteners carried by an adjacent frame element of the seat assembly.

13. An aircraft passenger seat assembly according to claim 11, wherein each seat pan is supported from beneath at least one of its left and right sides by:
    (a) a front leg extending from proximate the front edge of the seat pan to a position on the floor panel seat track forward of the front edge of the seat pan;
    (b) a rear leg extending from proximate the rear edge of the seat pan to a position rearward of the rear edge of the seat pan to a position on the floor panel seat track rearward of the rear edge of the seat pan; and
    (c) an intermediate leg extending between a position proximate an intersection of the front leg and seat pan to a position proximate an intersection of the rear leg and the floor panel seat track for providing a cross-brace supporting structure that positions the weight of the seat and a passenger seated therein between the front leg and rear leg and seat track attachment positions.

14. A method of mounting an aircraft passenger seat assembly within an aircraft, comprising the steps of:
    (a) fabricating a seat frame on which is mounted at least one seat back, a seat pan and a plurality of seat legs;
    (b) fabricating seat floor panels having integrated floor panel seat tracks mounted therein and mounting the seat floor panels onto an aircraft deck;
    (c) attaching a mounting rail onto an aircraft fuselage sidewall; and (d) detachably securing the seat legs to the floor panel seat tracks and the frame to the sidewall mounted rail at a height approximating the height of the seat pan.

15. An aircraft passenger seat assembly according to claim 1, and including the step of mounting the seat assembly longitudinally along a length of the aircraft deck in a laterally-offset position from the integrated seat tracks mounted in the floor panel.

16. A method according to claim 14, wherein the mounting rail is positioned to extend longitudinally along a length of the fuselage.

17. A method according to claim 14, and including the step of attaching the mounting rail longitudinally along a length of the fuselage at a height approximating the height of the seat pan.

18. A method according to claim 17, and including the step of attaching the seat assembly to the mounting rail with fasteners carried by an adjacent frame element of the seat assembly positioned in regularly spaced-apart mounting holes in the mounting rail.

19. A method according to claim 11, and including the step of supporting the seat assembly frame within the aircraft at two vertically spaced-apart positions.

20. A method according to claim 11, and including the steps supporting the seat pan from beneath at least one of its left and right sides by:
(a) positioning a front leg extending from proximate the front edge of the seat pan to a position on the floor panel seat track forward of the front edge of the seat pan;
(b) positioning a rear leg extending from proximate the rear edge of the seat pan to a position on the floor panel seat track rearward of the rear edge of the seat pan; and
(c) positioning an intermediate leg between a position proximate an intersection of the front leg and seat pan to a position proximate an intersection of the rear leg and the floor panel seat track for providing a cross-brace supporting structure that positions the weight of the seat and a passenger seated therein between the front leg and rear leg and seat track attachment positions.

* * * * *